United States Patent
Robinson et al.

(10) Patent No.: US 7,730,351 B2
(45) Date of Patent: Jun. 1, 2010

(54) PER FILE DIRTY REGION LOGGING

(75) Inventors: David Robinson, Austin, TX (US);
Brian L. Wong, Midlothian, VA (US);
Spencer Shepler, Austin, TX (US);
Richard J. McDougall, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 782 days.

(21) Appl. No.: 11/434,344

(22) Filed: May 15, 2006

(65) Prior Publication Data
US 2008/0010515 A1 Jan. 10, 2008

(51) Int. Cl.
G06F 11/00 (2006.01)
G06F 12/00 (2006.01)
G06F 17/00 (2006.01)

(52) U.S. Cl. .............. 714/15; 714/53; 714/54; 714/6; 714/42; 711/170; 707/100; 707/170; 707/202

(58) Field of Classification Search ................. 707/100; 714/6, 42; 717/170
See application file for complete search history.

(56) References Cited

U.S. PATENT DOCUMENTS

| | | | |
|---|---|---|---|
| 6,654,912 B1 * | 11/2003 | Viswanathan et al. | 714/42 |
| 7,096,379 B2 * | 8/2006 | Viswanathan et al. | 714/6 |
| 7,386,664 B1 * | 6/2008 | Roy et al. | 711/114 |
| 7,389,379 B1 * | 6/2008 | Goel et al. | 711/112 |
| 7,415,488 B1 * | 8/2008 | Muth et al. | 707/202 |
| 2001/0029511 A1 * | 10/2001 | Burda et al. | 707/202 |
| 2002/0152293 A1 * | 10/2002 | Hahn et al. | 709/223 |
| 2004/0153736 A1 * | 8/2004 | Viswanathan et al. | 714/6 |
| 2005/0262150 A1 * | 11/2005 | Krishnaswamy | 707/104.1 |
| 2006/0112140 A1 * | 5/2006 | McBride et al. | 707/104.1 |
| 2006/0112243 A1 * | 5/2006 | McBride et al. | 711/162 |
| 2007/0106677 A1 * | 5/2007 | Moore et al. | 707/100 |
| 2007/0106866 A1 * | 5/2007 | Moore et al. | 711/170 |
| 2007/0106867 A1 * | 5/2007 | Bonwick et al. | 711/170 |
| 2007/0106869 A1 * | 5/2007 | Moore et al. | 711/170 |

* cited by examiner

*Primary Examiner*—Robert Beausoliel
*Assistant Examiner*—Jeison C Arcos
(74) *Attorney, Agent, or Firm*—Osha • Liang LLP

(57) ABSTRACT

A method for dirty region logging of a file that includes receiving a request to open the file, determining each of a plurality of component files associated with the file, opening each of the plurality of component files, writing to a region of the at least one of the plurality component files, and updating a dirty region log (DRL) associated with the one of the plurality of component files to reflect the write to the region.

17 Claims, 4 Drawing Sheets

PER FILE DIRTY REGION LOGGING

BACKGROUND

Typical distributed systems include clients and servers. The servers are configured to interact with the clients and to provide service to the clients. One common service that the servers provide is file storage. Thus, clients can store a copy of their files on the server and in addition other clients can access the files stored on the server. If the files contain critical data, then it becomes advantageous to employ a data backup scheme to ensure that critical data is not lost if the server containing the data fails. One data backup scheme that is commonly employed is mirroring. Mirroring (also known as RAID 1) involves maintaining two (or more) copies of a file, where each copy of the file is located on separate file storage device (e.g., a local hard disk, a networked hard disk, a network file servers, etc.).

When one or more servers holding one or more mirror fails for any length of time, that mirror(s) may become unsynchronized. However, when employing a mirroring scheme, it is of critical importance to ensure that the mirrors are synchronized (i.e., that the content of each mirror is the same). If a mirror becomes unsynchronized, the simplest recovering scheme involves copying all of the data from a synchronized mirror to the unsynchronized mirror. A more efficient mirror recovery scheme is dirty region logging (DRL). In the conventional DRL schemes, each mirror is logically divided into a number of "regions." Depending on the implementation, the region may be as small as single disk sector or larger than 256 KB.

Whenever the content of a region changes, for example, when there is a write operation on data within the region, a dirty region log entry for the region is created in the dirty region log. In most cases, the dirty region log entry merely indicates that data in the region has changed. During normal execution, every time a region on a given mirror is modified, the corresponding region on the other mirror is also modified such that the mirrors remain synchronized. Thus, a dirty region log entry is created when the region is modified on the first mirror and then subsequently cleared once corresponding region on the other mirrors has been synchronized. If one or more mirrors fail prior to synchronization, then the dirty region log is used to determine which regions on the mirrors are not synchronized.

SUMMARY

In general, in one aspect, the invention relates to a method for dirty region logging of a file, comprising receiving a request to open the file, determining each of a plurality of component files associated with the file, opening each of the plurality of component files, writing to a region of the at least one of the plurality component files, and updating a dirty region log (DRL) associated with the one of the plurality of component files to reflect the write to the region.

In general, in one aspect, the invention relates to a method for recovering a file on a failed server comprising determining whether the file is dirty, determining a first component file and a second component file associated with the file, if the file is dirty, obtaining a first dirty region log (DRL) associated with the first component file and a second DRL associated with the second component file, merging the first DRL and the second DRL to obtain a merged DRL, wherein the merged DRL comprises at least one region selected from the group consisting of the first component file and second component file, and synchronizing contents of the at least one region in the first component file and the second component file using the merged DRL.

In general, in one aspect, the invention relates to a system, comprising a plurality of servers each configured to store one of a plurality of component files associated with a file and to store a dirty region log (DRL) associated with each of the plurality of component files, and a metadata server operatively connected to the plurality of servers configured to store a location of each of the plurality of component files of the file.

In general, in one aspect, the invention relates to a computer readable medium comprising software instructions for dirty region logging of a file, comprising software instructions to determine each of a plurality of component files associated with a file, open each of the plurality of component files, write to a region of the at least one of the plurality component files, and update a dirty region log (DRL) associated with the one of the plurality of component files to reflect the write to the region.

In general, in one aspect, the invention relates to a computer readable medium comprising software instructions for recovering a file on a failed server, comprising software instructions to determine whether the file is dirty, determine a first component file and a second component file associated with the file, if the file is dirty, obtain a first dirty region log (DRL) associated with the first component file and a second DRL associated with the second component file, merge the first DRL and the second DRL to obtain a merged DRL, wherein the merged DRL comprises at least one region selected from the group consisting of the first component file and second component file, and synchronize contents of the at least one region in the first component file and the second component file using the merged DRL.

Other aspects of the invention will be apparent from the following description and the appended claims.

DETAILED DESCRIPTION

Figure 1:
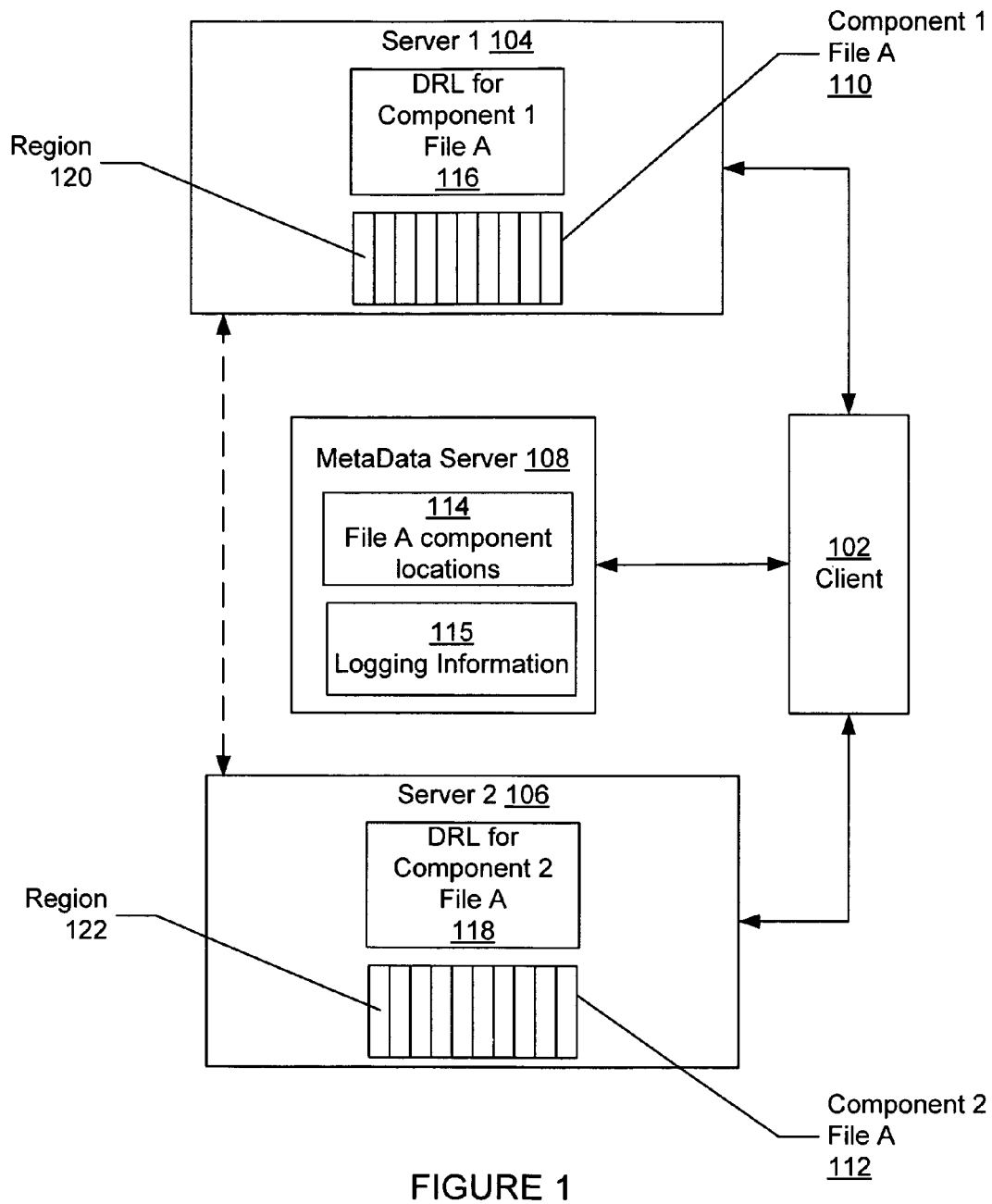
FIG. 1 shows a system architecture for dirty region logging in accordance with one embodiment of the invention.

Exemplary embodiments of the invention will be described with reference to the accompanying drawings. Like items in the drawings are denoted by the same reference numbers throughout the figures. Further, the use of "ST" in the drawings is equivalent to the use of "Step" in the detailed description below.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method for dirty region logging. Specifically, embodiments of the invention provide a method for efficiently maintaining a dirty region log on a per-file basis and recovering from server failure using the aforementioned dirty region log. Further, embodiments of the invention may also be used to allow a server to recover from a network partition (i.e., when a client and a server are fully functional but a one or more networking components have failed, thereby preventing them from communicating with each other).

FIG. 1 shows a system architecture for dirty region logging in accordance with one embodiment of the invention. As shown in FIG. 1, the system includes a client (102) interacting with one or more servers (104, 106) and a metadata server (108). Each of the aforementioned elements is described below.

In one embodiment of the invention, the system includes functionality to store files. More specifically, the system includes functionality to mirror files. In one embodiment of the invention, a file that is mirrored is stored as a series of component files, where each component file is a copy of the file. For example, if File A is mirrored in the system that includes a 2-way mirror (i.e., 2 copies of File A are maintained in the system), then the system may include the following component files: File A component 1 (110) and File A component 2 (112). As discussed below, the system includes functionality to independently change any of the component files and to synchronize the component files. Further, the system includes functionality to maintain the state of which files (including associated component files) are open as well as which files are dirty.

In one embodiment of the invention, the client (102) corresponds to a system that includes functionality to interact with the servers (104, 106) and the metadata server (108) using standard communication protocols. The client (102) also includes functionality to request files from the servers (104, 106) as well as information from the metadata server (108). In one embodiment of the invention, when the client (102) requests a file, each of the component files associated with the file are opened. Referring to the previous example, if the client (102) requests File A, then the system, in a manner transparent to the client (102), retrieves and opens all the component files associated with File A (i.e., File A component 1 (110) and File A component 2 (112)). Alternatively, in one embodiment of the invention, the client (102) may request the metadata server (108) to open File A. The metaserver (108) upon receiving the request, returns the locations all the component files associated with File A to the client (102). The client (102) may then proceed to open each of the component files associated with File A.

In one embodiment of the invention, the metadata server (108) corresponds to a system that stores component locations for files (e.g., File A component locations (114)). The component locations for individual files may correspond to server names, server names and file paths (e.g., server 1:/export/file A component 2), etc. Further, in one or more embodiments of the invention, the metadata server (108) may also store other metadata associated with a particular file. For example, besides location information, metadata might have information about other files with which the file is associated, ownership information associated with the file, history information (such as access information, creation and modification dates, etc.), qualities of the file (e.g., a highly reliable file), programs associated with the file, etc. Further, the metadata server (108) may contain logging information (115). For example, the metadata server (108) may maintain a dirty log file that includes information about which files (i.e., files called by the client) are dirty. In addition, the metadata server (108) may include information about which component files associated with a given file are dirty.

In one embodiment of the invention, server 1 (104) and server 2 (106) include functionality to store data (e.g., component files) and to service requests for files. In one embodiment of the invention, the server (104, 106) is a network file server. In addition, servers (104, 106) also include functionality to create and manage dirty region logs for all files located on the server. For example, as shown in FIG. 1, server 1 (104) includes Component 1 File A (110) and the associated DRL for Component 1 File A (116). Similarly, server 2 (106) includes Component 2 File A (112) and the associated DRL for Component 2 File A (118).

As shown in FIG. 1, Component 1 File A (110) and Component 2 File A (112) are divided into several regions (i.e., 120, 122). The size of each region (120, 122) may vary according to implementation. For example, the size of the region (120, 122) may correspond to a multiple of a disk sector, correspond to a multiple of a file system block size, etc. In accordance with one or more embodiments of the invention, advantages of making the size of the region (112, 114) a multiple of the file system block size is that only the first write to a region (112, 114) needs to be marked on the DRL (116, 118) (described below).

In one embodiment of the invention, the region may include any number of nested regions. Further, in one embodiment of the invention, the region may correspond to a non-contiguous set of data. Those skilled in the art will appreciate that a region may correspond to any combination of data (contiguous or non-contiguous) in the system.

In one embodiment of the invention, the DRL (116, 118) for a file A component (116, 118) stores information about which regions are dirty (i.e., the regions that have been modified). In one embodiment of the invention, the DRL (116, 118) may be implemented using a bitmap (e.g., a collection of ordered bits in which each bit is associated with a particular region). In the bitmap implementation, declaring a region as dirty may by done by changing the bit from 0 (which denotes a clean region) to 1 (which denotes a dirty region). Accordingly, a bit value 1 in the fourth position may be used to indicate that the fourth region is dirty, while a bit value of 0 in the second position indicates that the second region is clean (i.e., has not been modified).

Although FIG. 1 shows a DRL for a component file that is stored separately from the component file, in one embodiment of the invention, the DRL for the component file is stored as an extended attribute of the component file. Further, in one embodiment of the invention, rather than having a separate DRL for each component file stored on the server, there may be a single DRL for all component files on the server. Those skilled in the art will appreciate that multiple methods exist for implementing a DRL, the above implementations are described only for exemplary purposes. Those skilled in the art will appreciate that instead of storing the aforementioned DRL information in an extended attribute, the DRL may be stored in a reserved part of the file or in another auxiliary file.

As discussed above, the servers (104, 106) include functionality to manage the DRLs. In one embodiment of the invention, managing the DRLs include updating the DRL to indicate that a particular region is dirty (i.e., that the region has been modified). Further, managing the DRLs includes updating the DRL to indicate that a particular region that was once dirty is now clean (i.e., that the particular region has been synchronized with all the other corresponding regions on the other servers in the system).

In one embodiment, the server (104, 106) may be configured to send and/or receive acknowledgement messages, which indicate that a particular region on the server (104, 106)

has been updated. In addition the messages being communicated between the client and the server, in one embodiment of the invention, these message may be communicated solely between the servers (104, 106) in order to update the corresponding mirrors and DRLs.

While FIG. 1 shows a system in which the metadata server (108) is separate of the servers containing the component files, in one embodiment of the invention, each server may also include the functionality of the metadata server. Thus, the functions performed by the metadata server may be performed by each server. Those skilled in the art will appreciate that the system may include multiple metadata servers (108).

Figure 2:
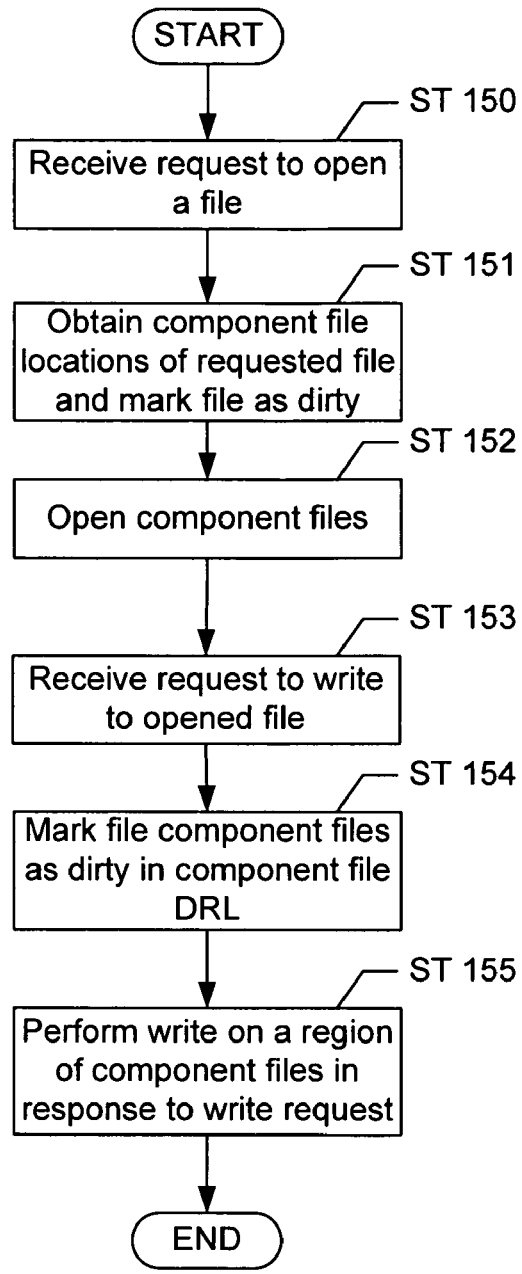
FIG. 2 shows a method for creating a per-file dirty region log in accordance with one embodiment of the invention.

FIG. 2 shows a method for creating a per-file dirty region log in accordance with one embodiment of the invention. Initially, a request is received to open a file (Step 150). The locations of the component files corresponding to the requested file are subsequently obtained and the file (e.g., File A) is marked as dirty (Step 151). In one embodiment of the invention, the component file locations may be obtained from the metadata server. Alternatively, the component file locations may be obtained directly from one of the server, if one or more servers in the system include the functionality of the metadata server (discussed above). In one embodiment of the invention, the information about whether a given file (as opposed to components files) is dirty is stored in the metadata server.

Continuing with the discussion of FIG. 2, the component files are opened at the component file locations (e.g., on the particular server on which the component file resides) (Step 152). After being opened, a request is received to write to the opened file (Step 153). Those skilled in the art will appreciate that the request to write to the opened file is typically made by the client without any knowledge of the component files. Thus, the client may request to write to File A, as opposed to write to Component 1 File A and Component 2 File A. However, the result of a request to write to File A is to write to the Component 1 File A and Component 2 File B. Prior to performing the write operation on a particular component file, the component file is marked as dirty in each component files DRL (Step 154). After the component file is marked as dirty, the write operation is performed on a region of the component file in response to the write request (Step 155). Subsequent writes (or other modifications) to the marked regions may be performed without accessing or updating the DRL.

Those skilled art will appreciate that if the client (102) is able to obtain the locations of the individual component files associated with the file, then the client (102) may write directly to a specific component file.

Those skilled in the art will appreciate that once the write operation has been successfully performed in all of the components files associated with the file, then the DRL for all of component files may be cleared (i.e., all the regions affected by the write operation are marked as clean). Those skilled in the art will appreciate that any mechanism may be used to verify that the write operation has been successfully performed may be used. Further, any mechanism may be used to communicate the verification of the write operation to the servers in the system.

Occasionally, as those skilled in the art will appreciate, a server failure may occur where a server does not receive one or more write requests or in which the server fails completely. In such cases, the content of the various component files associated with a given file may not be synchronized.

Figure 3:
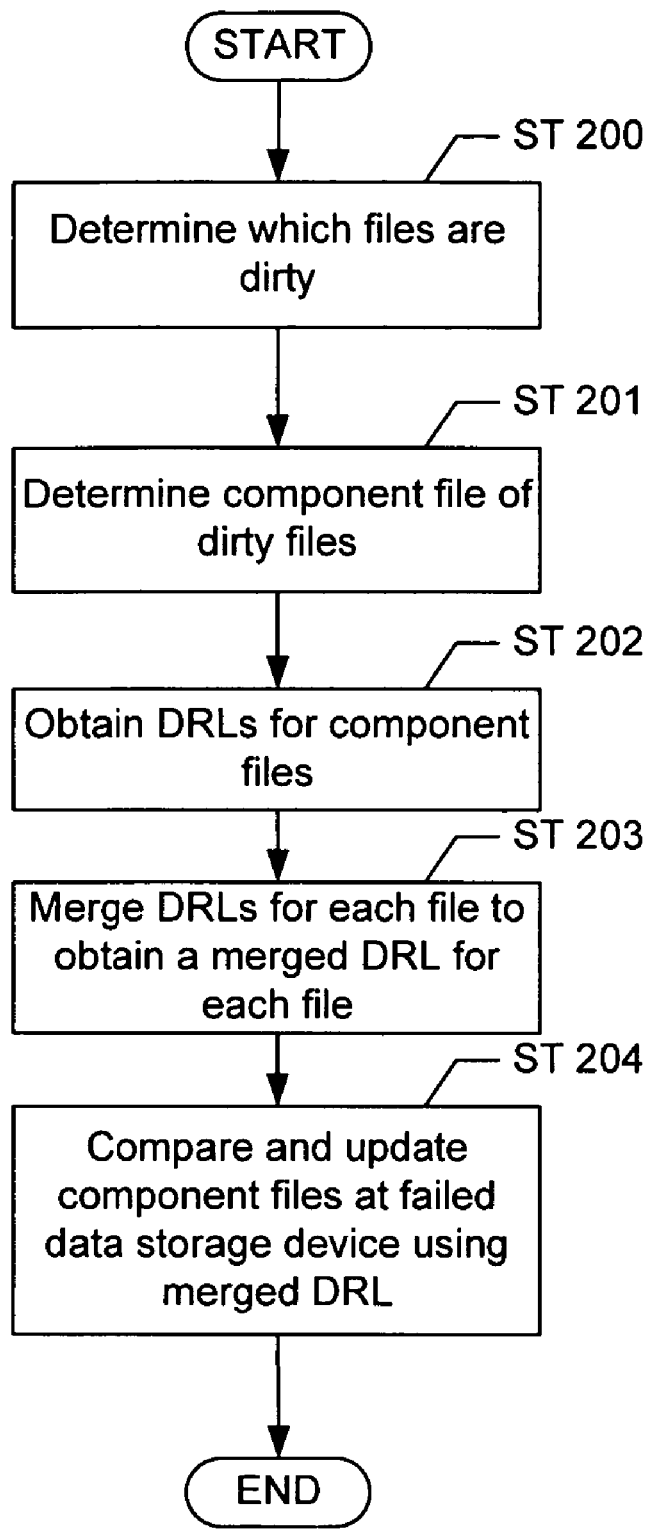
FIG. 3 shows a method for recovering a data storage device in accordance with one embodiment of the invention.

FIG. 3 shows a method for recovering a failed server in accordance with one embodiment of the invention. Initially, a determination is made about which files are dirty (Step 200). In one embodiment of the invention, the determination about which files are dirty may be ascertained from searching the metadata server. Next, the component files for each dirty file identified in Step 200 are determined (e.g., a list of component files is obtained) (Step 201).

In Step 202, the DRLs for each of the component files identified in ST201 are obtained. These DRLs associated with all component files of a given file are then merged into a single DRL for that file (Step 203). The merging may be performed, for example, by taking the union of all of the DRLs associated with the file (i.e., the DRLs for all component files associated with the file). Those skilled in the art will appreciate that other methods of merging the aforementioned DRLs may be used. Thus, the single DRL represents all changes made across all servers storing the file. Next, the component files for a given file are updated using the merged DRL (Step 204). Those skilled in the art will appreciate that at the completion of Step 204, the DRLs indicate that files and the associated component files are clean.

The following is an example that uses the methods described in FIGS. 2 and 3. The example is not intended to limit the scope of the invention. Consider a system that includes a single file, foo.c that includes two component files: foo_1.c and foo_2.c. Initially, a client requests to open foo.c. In response to the request to open foo.c, a metadata server records that foo.c is now dirty. In addition, foo_1.c and foo_2.c are opened. At a subsequent point in time, there is a write operation that includes writing to regions 2, 3, and 4 (denoted as R2, R3, and R4). R2, R3, and R4 are updated on foo_1.c and the DRL associated with foo_1.c is updated to reflect that R2, R3, and R4 are now dirty. In addition, R2 and R3 are updated in foo_2.c and the DRL associated with foo_2.c is updated accordingly. At this stage, an acknowledgement message is issued that indicates R2 is clean. However, before R4 in foo_2.c is updated, the server on which foo_2.c is located fails. At this stage, R2 is clean and R3 and R4 are dirty.

During the subsequent recovery of failed server (i.e., the server on which foo_2.c is located), foo.c is identified as a dirty file and the DRLs associated with the components of foo.c, namely, foo_1.c and foo_2.c are retrieved and merged. The resulting DRL after the merge operation indicates that R3 and R4 are dirty. R3 and R4 on both foo_1.c and foo_2.c are compared and foo_2.c is updated accordingly. In this example, R3 and R4 would all be compared but only R4 is updated on foo_2.c.

Embodiments of the invention may be performed using any type of distributed file system protocol. For example, if the Network File System protocol is used, then the system maintains the file's open state, and modifications to a file affect all associated component files In accordance with one embodiment of the invention, the client (as opposed to the servers) may maintain a DRL for all component files that are opened. Further, in one embodiment of the invention, on each write operation, the client sends a compound request to each server, where the compound request includes a request to update the extended attribute containing the file's DRL and a request to perform the write operation.

Those skilled in the art will appreciate that embodiments of the invention discussed above may be readily modified to allow the invention to work with a portion of a file as opposed to an entire file.

Further, embodiments of the invention may be used with in other applications (i.e., applications other than mirroring) in which data is changed in more than location.

Figure 4:
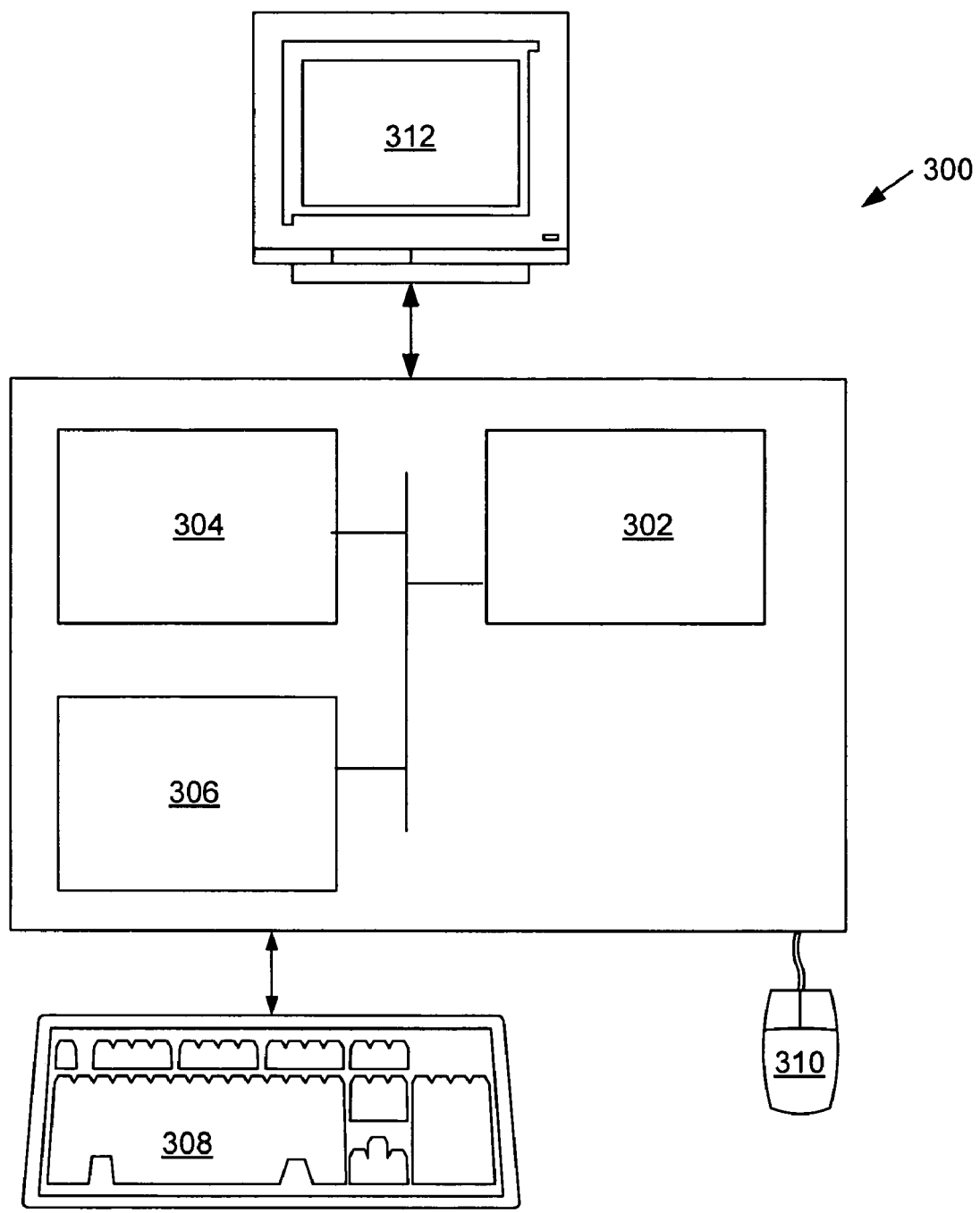
FIG. 4 shows a computer system for performing dirty region logging in accordance with one embodiment of the invention.

The invention may be implemented on virtually any type of computer regardless of the platform being used. For example, as shown in FIG. 4, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., server, metadata server, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of the invention provide for an efficient method for recovering a failed server. Specifically, by maintaining a dirty region log, the entire component file on a failed server does not need to be compared against the component files on all other failed servers. Rather, only the dirty regions need to be compared and updated. This allows for a high degree of scalability of file size. Additionally, by having a dirty region log on each server storing a file, the metadata server is not required to keep track of each modified region. Thus, a higher degree of scalability of the number of files stored by the system is achieved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dirty region logging of a file, comprising:
   receiving a request to open the file, wherein the file is one of a plurality of stored files;
   determining each of a plurality of component files associated with the file, wherein each of the plurality of component files comprises a plurality of regions, and wherein each of the plurality of component files is a copy of the file;
   opening each of the plurality of component files;
   receiving a request to write to a region of the at least one of the plurality of component files;
   updating a dirty region log (DRL) associated with at least one of the plurality of component files to reflect the write to the region in response to the request; and
   writing to the region of the at least one of the plurality of component files in response to the request.

2. The method of claim 1, further comprising marking the file as a dirty in response to the request.

3. The method of claim 1, wherein determining each of the plurality of component files associated with the file comprises determining a location of the plurality of component files.

4. The method of claim 1, wherein the DRL corresponds to a bitmap.

5. The method of claim 1, wherein the file is stored on a server implementing Network File System version 4 (NFSv4).

6. The method of claim 1, wherein a server that received the request updates the DRL in response to the request.

7. The method of claim 1, wherein the DRL is updated by a client that sent the request to a server.

8. The method of claim 7, wherein the client uses a compound request to update the DRL, wherein the DRL is stored on the server.

9. The method of claim 1, wherein the DRL for the at least one of the plurality of component files is stored in an extended attribute of the at least one of the plurality of component files.

10. A method for recovering a file comprising:
    determining whether the file is dirty, wherein the file is dirty when at least one component file associated with the file is dirty;
    determining a first component file and a second component file associated with the file when the file is dirty, wherein both the first component file and the second component file each comprise a plurality of regions, wherein the first component file and the second component file are copies of the file;
    obtaining a first dirty region log (DRL) associated with the first component file and a second DRL associated with the second component file;
    merging the first DRL and the second DRL to obtain a merged DRL, wherein the merged DRL comprises at least one region selected from the group consisting of the first component file and second component file; and
    synchronizing contents of the at least one region in the first component file and the second component file using the merged DRL.

11. The method of claim 10, wherein merging the first DRL and the second DRL comprises performing a union operation between dirty regions in the first DRL and dirty regions in the second DRL.

12. The method of claim 10, wherein the failed server implements Network File System version 4 (NFSv4).

13. The method of claim 10, wherein the first DRL is located on a client and the second DRL is located on a server, wherein the file is located on the server.

14. A system, comprising:
    a plurality of servers each configured to store one of a plurality of component files associated with a file and to store a dirty region log (DRL) associated with each of the plurality of component files, wherein the file is one of a plurality of files stored on the plurality of servers, wherein each of the plurality of component files is located on a separate server, wherein each of the plurality of component files is a copy of the file, and wherein each of the plurality of component files comprises a plurality of regions; and
    a metadata server operatively connected to the plurality of servers configured to store a location of each of the plurality of component files of the file, wherein the metadata server is located on a separate server from each of the plurality of servers.

15. The system of claim 14, wherein metadata server is further configured to:
    receive a request to perform a write operation on the file; and
    determine each of the plurality of component files associated with the file; and
    record that the file is dirty in response to write request.

16. The system of claim 14, wherein each of the plurality of servers is configured to:

determine whether the file is dirty using the metadata server;

determine a first component file and a second component file associated with the file, if the file is dirty;

obtain a first dirty region log (DRL) associated with the first component file and a second DRL associated with the second component file;

merge the first DRL and the second DRL to obtain a merged DRL, wherein the merged DRL comprises at least one region selected from the group consisting of the first component file and second component file; and synchronize contents of the at least one region in the first component file and the second component file using the merged DRL, wherein the first component file is located a first one of the plurality of servers and the second component file located on second one of the plurality of servers.

17. The system of claim 14, wherein merging the first DRL and the second DRL comprises performing a union operation between dirty regions in the first DRL and dirty regions in the second DRL.

* * * * *

UNITED STATES PATENT AND TRADEMARK OFFICE
CERTIFICATE OF CORRECTION

| | |
|---|---|
| PATENT NO. | : 7,730,351 B2 |
| APPLICATION NO. | : 11/434344 |
| DATED | : June 1, 2010 |
| INVENTOR(S) | : David Robinson et al. |

It is certified that error appears in the above-identified patent and that said Letters Patent is hereby corrected as shown below:

In column 4, line 36, delete "by" and insert -- be --, therefor.

In column 6, line 50, after "files" insert -- . --.

Signed and Sealed this
Second Day of August, 2011

David J. Kappos
*Director of the United States Patent and Trademark Office*